(12) United States Patent
Boukhayma (10) Patent No.: US 9,497,400 B2
(45) Date of Patent: Nov. 15, 2016

(54) CORRELATED MULTIPLE SAMPLING CMOS IMAGE SENSOR

(71) Applicant: Commissariat à l'énergie atomique et aux énergies alternatives, Paris (FR)

(72) Inventor: Assim Boukhayma, Grenoble (FR)

(73) Assignee: Commissariat a lénergie atomique et aux energies alternatives (FR)

( * ) Notice: Subject to any disclaimer, the term of this patent is extended or adjusted under 35 U.S.C. 154(b) by 0 days.

(21) Appl. No.: 14/755,806

(22) Filed: Jun. 30, 2015

(65) Prior Publication Data

US 2016/0014361 A1    Jan. 14, 2016

(30) Foreign Application Priority Data

Jul. 9, 2014    (FR) ...................................... 14 56598

(51) Int. Cl.
| | |
|---|---|
| *H04N 5/374* | (2011.01) |
| *H04N 5/369* | (2011.01) |
| *H04N 5/355* | (2011.01) |
| *H04N 5/357* | (2011.01) |
| *H04N 5/3745* | (2011.01) |
| *H04N 5/378* | (2011.01) |

(52) U.S. Cl.
CPC .............. *H04N 5/374* (2013.01); *H04N 5/357* (2013.01); *H04N 5/3559* (2013.01); *H04N 5/3575* (2013.01); *H04N 5/369* (2013.01); *H04N 5/378* (2013.01); *H04N 5/3745* (2013.01)

(58) Field of Classification Search
CPC ...... H04N 5/374; H04N 5/378; H04N 5/357; H04N 5/3745; H04N 5/3575; H04N 5/369; H04N 5/3559

See application file for complete search history.

(56) References Cited

U.S. PATENT DOCUMENTS

| | | | | |
|---|---|---|---|---|
| 7,609,303 B1 * | 10/2009 | Lee | ...................... | H04N 5/3575 348/241 |
| 2004/0041927 A1 * | 3/2004 | Cho | ...................... | H04N 3/155 348/254 |
| 2005/0103977 A1 * | 5/2005 | Krymski | ............... | H04N 5/347 250/208.1 |

(Continued)

FOREIGN PATENT DOCUMENTS

| | | |
|---|---|---|
| EP | 1928166 A2 | 6/2004 |
| EP | 1549050 A2 | 6/2005 |

OTHER PUBLICATIONS

"French Search Report," dated Feb. 10, 2015 issued in counterpart French Patent Application No. 14/56598.

(Continued)

*Primary Examiner* — Timothy J Henn
(74) *Attorney, Agent, or Firm* — Kaplan Breyer Schwarz & Ottesen LLP (57) ABSTRACT

A CMOS image sensor including at least one pixel and one circuit arranged to receive, on a first node of the circuit, an analog signal representative of the luminosity level received by the pixel, the circuit being capable of successively acquiring $2^n$ samples of said signal, n being an integer greater than or equal to 1, and of delivering, on a second node of the circuit, an analog signal having a value equal to the average of the values of said samples, without generating an intermediate signal having a value greater than the value of the largest acquired sample.

5 Claims, 3 Drawing Sheets

(56) References Cited

U.S. PATENT DOCUMENTS

| | | | |
|---|---|---|---|
| 2005/0206752 A1* | 9/2005 | Lim | H04N 5/3575 348/241 |
| 2008/0036889 A1* | 2/2008 | Yamada | H04N 5/35572 348/294 |
| 2008/0062286 A1* | 3/2008 | Beck | H04N 5/357 348/241 |
| 2010/0231796 A1 | 9/2010 | Mandelli | |
| 2011/0261177 A1* | 10/2011 | Moore | H04N 5/361 348/65 |
| 2013/0068934 A1* | 3/2013 | Hu | H04N 5/347 250/208.2 |

OTHER PUBLICATIONS

J. Steesgaard, et al., "Mistach-shaping switching for two-capacitor DAC", "Electronics Letters, IEE Stevenage", Aug. 20, 1998, pp. 1633-1634, vol. 34, No. 17, Publisher: colonne de gauche (XP006010181), Published in: GB.

* cited by examiner

CORRELATED MULTIPLE SAMPLING CMOS IMAGE SENSOR

The present patent application claims the priority benefit of French patent application FR14/56598, the contents of which is hereby incorporated by reference in its entirety to the maximum extent allowable by law.

BACKGROUND

The present disclosure relates to the field of CMOS image sensors. It particularly aims at a low-noise CMOS image sensor, capable of operating in low luminosity conditions.

DISCUSSION OF THE RELATED ART

Conventionally, a CMOS image sensor comprises pixels arranged in an array of rows and columns. Each pixel comprises a photodiode used in reverse mode, having its junction capacitance discharged by a photocurrent according to a received light intensity. At the end of a period, called image acquisition or integration period, before and after which the pixel is reset by recharging of its photodiode, the photogenerated charges stored in the photodiode are transferred to a capacitive sense node of the pixel. The illumination level received by the pixel is measured by measuring the potential variation of the pixel sense node, caused by the transfer, on this node, of the charges photogenerated in the photodiode of the pixel.

In practice, various noise sources are capable of affecting the measurement, which may raise an issue when the quantity of charges photogenerated in the photodiode is small, and particularly when the sensor is used in low luminosity conditions.

Figure 1:
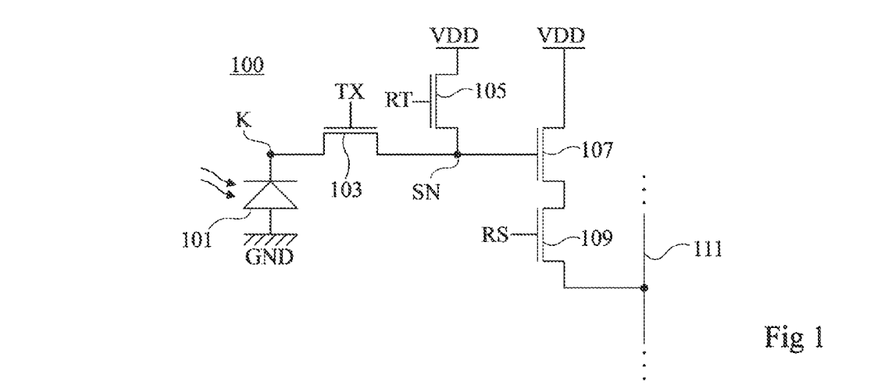
FIG. 1, previously described, is an electric diagram of an example of a pixel of a CMOS image sensor.

FIG. 1 is an electric diagram showing an example of a pixel 100 of a CMOS image sensor. Pixel 100 comprises a photodiode 101, a storage node K formed by the cathode of photodiode 101, and a sense node SN. The anode of photodiode 101 is connected to a node of application of a low reference potential GND, for example, the ground. Pixel 100 further comprises a transfer transistor 103 having its conduction nodes (source/drain) respectively connected to node K and to node SN, a reset transistor 105 having its conduction nodes respectively connected to node SN and to a node of application of a high reference potential VDD, a read transistor 107 assembled as a source follower, having its gate connected to node SN and having its drain connected to a node of application of a reference potential, and a selection transistor 109 having its conduction nodes respectively connected to the source of read transistor 107 and to an output conductive track 111, which may be common to a plurality of pixels of the sensor. In the shown example, transistors 103, 105, 107, and 109 are N-channel MOS transistors, and transistor 107, assembled as a source follower (or common drain assembly), has its drain connected to a node of application of a high reference potential, potential VDD in the present example. In operation, the potential variations of node SN are transferred to the source of transistor 107 in a substantially identical form. Pixel 100 receives control signals TX, RT, and RS respectively applied to the gates of transistors 103, 105, and 109.

As an example, pixel 100 may be controlled as follows: during a pixel integration phase (preceded by a step of resetting photodiode 101), transfer transistor 103 is kept non-conductive (signal TX in the low state in the present example) to isolate storage node K from sense node SN. The electric charges generated in photodiode 101 under the effect of light then cause a progressive decrease of the voltage of node K.

Before the end of the integration phase, reset transistor 105 is turned on (signal RST in a high state in this example) to reset the potential of sense node SN to potential VDD, after which transistor 105 is turned off to isolate node SN from node VDD.

After the step of resetting node SN, the potential of node SN is read and stored in a first read step, to be used as a reference for a subsequent step of measuring the discharge level of the photodiode. To achieve this, selection transistor 109 is turned on (signal RS in a high state in this example), so that the potential of node SN is transferred to output track 111, via transistors 107 and 109. The potential of track 111 is then read and stored, via a read circuit, not shown.

After the first reading step, transfer transistor 101 is turned on (signal TG in the high state in this example) to cause the transfer of the photogenerated charges stored in the photodiode onto sense node SN. The voltage at node SN then decreases by a value representative of the amount of photogenerated charges stored in the photodiode, and thus of the light intensity received by the photodiode during the integration.

The potential of node SN, transferred onto output track 111 by transistors 107 and 109, is then read again during a second read step, by a read circuit, not shown.

The output value of the pixel is equal to the difference between reset potential $V_{OUT1}$ read from track 111 during the first reading step and potential $V_{OUT2}$ read from track 111 during the second reading step, or signal potential. An analog subtraction circuit, not shown, may be provided to calculate this difference.

Such a reading method, generally called CDS in the art, for "Correlated Double Sampling", enables to at least partly do away with certain sources of noise, such as the reset noise introduced by transistor 105.

To further decrease the pixel noise, a read method called CMS in the art, for "Correlated Multiple Sampling", has been provided. CMS reading essentially differs from CDS reading in that:

after the step of resetting node SN and before the transfer of the photogenerated charges onto node SN, the reset potential on node SN, instead of being read once, is read M successive times, where M is an integer greater than 1; and after the transfer of the photogenerated charges onto sense node SN. The signal potential on node SN, instead of being read once, is read M successive times.

The M samples of the reset potential on the one hand and the M samples of the signal potential on the other hand are averaged, and the difference between the average of the reset level and the average of the signal level defines the output value of the pixel.

This type of reading method is generally called CMS in the art, for "Correlated Multiple Sampling". Such a reading method has the same advantages in terms of noise reduction as a CDS-type reading, and enables to further decrease the reading noise, particularly due to transistors 107 and 109.

Examples of circuits capable of implementing a CMS-type reading in a CMOS image sensor have been described in article "Column-Parallel Correlated Multiple Sampling Circuits for CMOS Image Sensors and Their Noise Reduction Effects" of Sungho Suh et al. (Sensors 2010, 10, 9139-9154). Such circuits however have various disadvantages.

In the circuit of FIG. 1 of the above-mentioned article, the M samples of the reset potential are integrated (that is, summed up) in a first capacitor, and the resulting signal is stored in a second capacitor. The M samples of the signal potential are then integrated (summed up) in the first capacitor and the resulting signal is stored in a third capacitor. The difference between the voltage across the second capacitor and the voltage across the third capacitor is then calculated, and defines the output value of the pixel. A disadvantage of such a circuit is that the accumulation of M successive samples of the reset potential on the one hand and of the signal potential on the other hand decreases by a factor M the dynamic range of the pixel, that is, the range of luminosity levels that the pixel is capable of discriminating.

In the circuit of FIG. 3 of the above-mentioned article, to avoid such a dynamic range decrease, it is provided to integrate in a capacitor, instead of the M successive samples of the reset potential (respectively of the signal potential), the difference between each sample of the reset potential (respectively of the signal potential) and a reference potential. A disadvantage of such a circuit is its complexity and its relatively significant electric power consumption, particularly resulting from the presence of a comparator comparing each sample with a reference potential. Further, problems of non-linearity of the output value of the pixel may arise.

Article "A 1.1e-Temporal Noise 1/3.2-inch 8Mpixel CMOS Image Sensor using Pseudo-Multiple Sampling" of Yong Lim et al. (ISSCC 2010/SESSION 22/IMAGE SENSORS/22.2) further provides a CMOS image sensor capable of implementing a CMS-type reading, where the M successive samples of the reset potential and the M successive samples of the signal potential are first digitized, and the difference between the average of the reset potential samples and the average of the signal potential samples is digitally calculated. A disadvantage of such a sensor is due to the performance constraints (particularly in terms of speed) bearing on the analog-to-digital converters of the sensor.

There is a need for a CMOS image sensor capable of implementing a CMS-type reading method, such a sensor overcoming all or part of the disadvantages of existing sensors.

SUMMARY

Thus, an embodiment provides a CMOS image sensor comprising at least one pixel and one circuit arranged to receive, on a first node of the circuit, an analog signal representative of the luminosity level received by the pixel, the circuit being capable of successively acquiring $2^n$ samples of said signal, n being an integer greater than or equal to 2, and of delivering, on a second node of the circuit, an analog signal having a value equal to the average of the values of said samples, without generating an intermediate signal having a value greater than the value of the largest acquired sample, the circuit comprising: first and second capacitors, the second capacitor having a first electrode connected to the first node via a first switch, and a second electrode connected to a node of application of a reference potential, and the first capacitor having a first electrode connected to the second node and connected to the first electrode of the second capacitor via a second switch, and a second electrode connected to a node of application of the reference potential; n−1 branches, each comprising two switches in series between the first electrode of the second capacitor and the first electrode of the first capacitor, and a capacitor connecting the junction point of the two switches of the branch and a node of application of the reference potential; and a control unit capable of controlling the switches to successively acquire $2^n$ samples of the voltage at the first node in the n+1 capacitors, and of delivering, across the second capacitor, a voltage equal to the average of the acquired samples.

According to an embodiment, the capacitors have the same capacitance.

According to an embodiment, the first node of the circuit is connected to the pixel via an amplification stage.

According to an embodiment, the pixel comprises a photodiode connected to a sense node by a transfer transistor.

According to an embodiment, the sensor comprises a control circuit capable of, during a phase of reading an output value of the pixel: resetting the sense node; controlling the circuit to acquire $2^n$ samples representative of the potential of the sense node and delivering a first analog signal having a value equal to the average of these samples; transferring photogenerated charges stored in the photodiode of the pixel onto the sense node via the transfer transistor; controlling the circuit to acquire $2^n$ samples representative of the potential of the sense node and deliver a second analog signal having a value equal to the average of these samples; and delivering an output value equal to the difference between the first and second analog signals.

The foregoing and other features and advantages will be discussed in detail in the following non-limiting description of specific embodiments in connection with the accompanying drawings.

Figure 3:
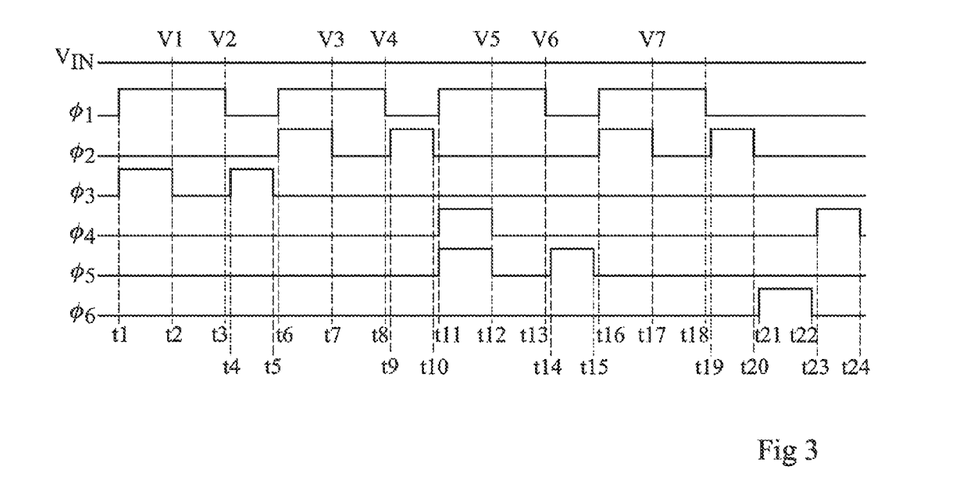
FIG. 3 is a timing diagram illustrating an example of a method of controlling the circuit of FIG. 2.
Figure 6:
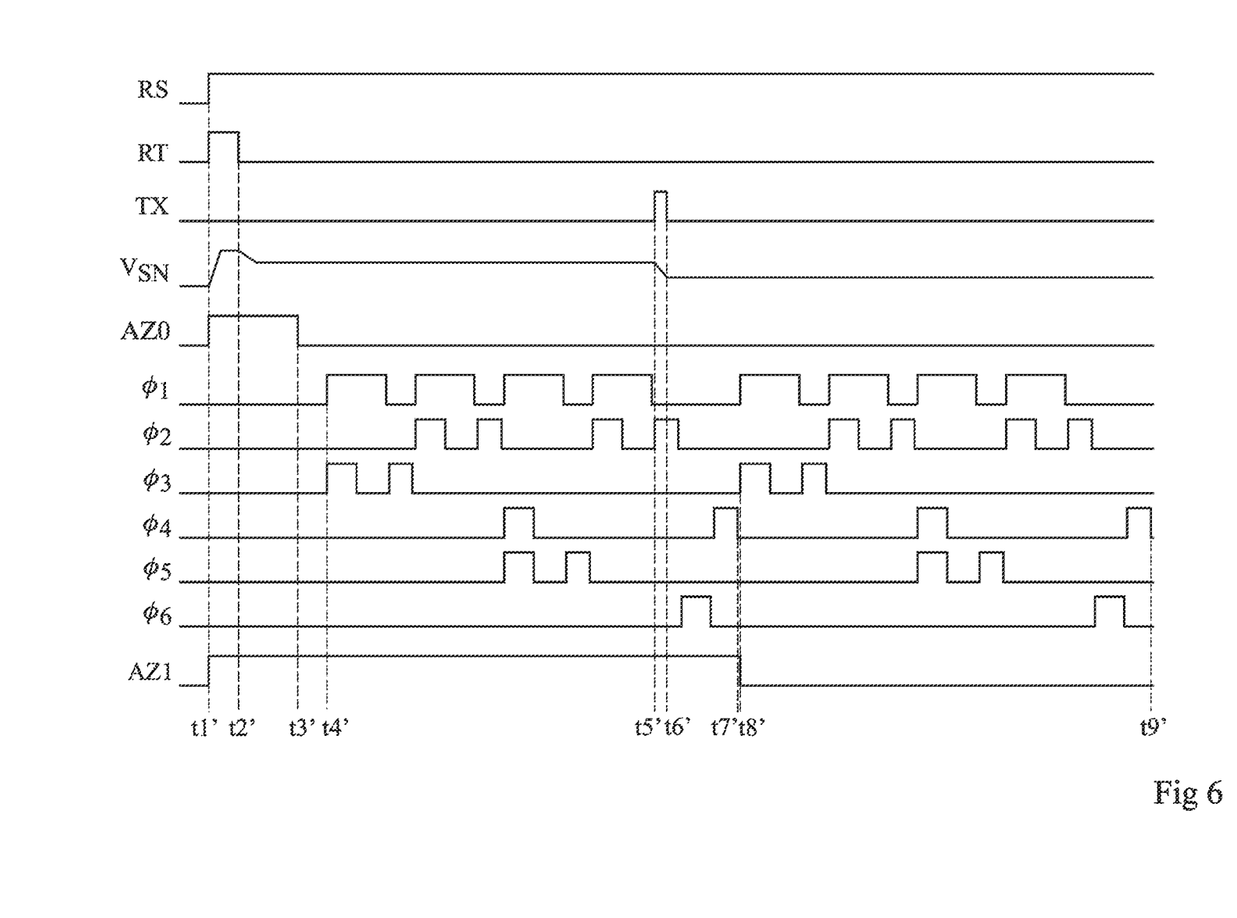
FIG. 6 is a timing diagram illustrating an example of a method of controlling the sensor of FIG. 5.

For clarity, the same elements have been designated with the same reference numerals in the various drawings and, further, the timing diagrams of FIGS. 3 and 6 are not to scale.

DETAILED DESCRIPTION

According to an aspect of the described embodiments, a CMOS image sensor comprising a circuit capable of analogically calculating the average of M successive samples of an output signal of a pixel of the sensor, without generating an intermediate value greater than that largest acquired sample value, is provided. An advantage is that a CMS-type reading method can thus be implemented without for the dynamic range of the sensor to be limited by the average calculation circuit.

In a preferred embodiment, which will now be described, the average calculation circuit is a switched-capacitance circuit, having its operation based on the following principle: when two capacitors of same capacitance, respectively charged to voltages V1 and V2, are connected in parallel, the voltage across the parallel association of the two capacitors takes value (V1+V2)/2. Connecting two capacitors in parallel thus enables to calculate the average of two voltage values, without generating an intermediate value greater than the largest of the two voltage values. According to an aspect, an average calculation circuit using this principle to recursively calculate the average of M samples of the potential of an input node IN of the circuit is provided, in the case where M is a non-zero power of 2, that is, $M=2^n$, n being an integer greater than or equal to 1.

Figure 2:
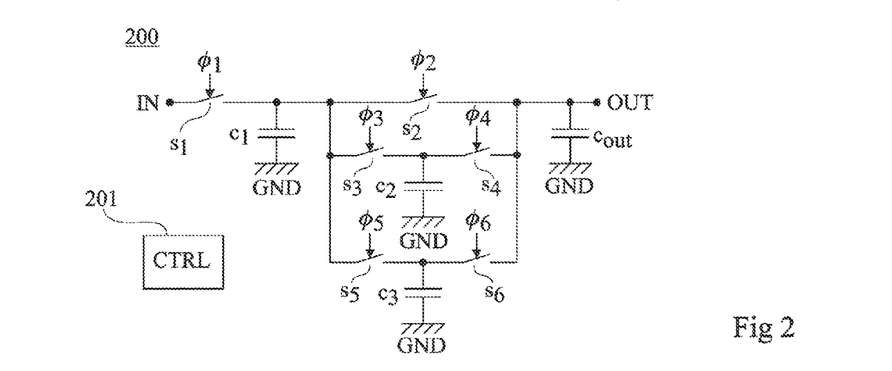
FIG. 2 is a partial electric diagram of an embodiment of a circuit enabling to implement a CMS-type reading in a CMOS image sensor.

FIG. 2 is an electric diagram of an embodiment of a circuit 200 capable of acquiring and of calculating the average of M=8 successive samples of the potential of an input node IN of the circuit, without generating an intermediate signal having a value greater than the largest acquired sample value.

Circuit 200 comprises a capacitor $c_1$ having a first electrode connected to input node IN by a switch $s_1$ and to an output node OUT of the circuit by a switch $s_2$, and having its second electrode connected to a node of application of a reference potential GND, for example, the ground. Circuit 200 further comprises a capacitor $c_{out}$ having a first electrode connected to node OUT and having its second electrode connected to a node of application of reference potential GND. Circuit 200 further comprises, in parallel with switch $s_2$, between the first electrode of capacitor $c_1$ and the first electrode of capacitor $c_{out}$, a first branch comprising two series-connected switches $s_3$ and $s_4$, the junction point of switches $s_3$ and $s_4$ being connected to a node of application of reference potential GND by a capacitor $c_2$, and a second branch comprising two series-connected switches $s_5$ and $s_6$, the junction point of switches $s_5$ and $s_6$ being connected to a node of application of reference potential GND by a capacitor $c_3$.

The control nodes of switches $s_1$, $s_2$, $s_3$, $s_4$, $s_5$, and $s_6$ are respectively connected to nodes of application of control signals $\Phi_1$, $\Phi_2$, $\Phi_3$, $\Phi_4$, $\Phi_5$, and $\Phi_6$.

Circuit 200 further comprises a control unit 201 (CTRL) capable of delivering signals $\Phi_1$, $\Phi_2$, $\Phi_3$, $\Phi_4$, $\Phi_5$, and $\Phi_6$ for controlling switches $s_1$, $s_2$, $s_3$, $s_4$, $s_5$, and $s_6$.

FIG. 3 is a timing diagram illustrating an example of the method of controlling the circuit of FIG. 2, enabling to calculate the average of M=8 successive samples of potential $V_{IN}$ of node IN. More particularly, FIG. 3 shows the time variation of potential $V_{IN}$ of node IN and of signals $\Phi_1$, $\Phi_2$, $\Phi_3$, $\Phi_4$, $\Phi_5$, and $\Phi_6$ for controlling switches $s_1$, $s_2$, $s_3$, $s_4$, $s_5$, and $s_6$.

At a time t1, switches s1 and s3 are turned on (signals $\Phi_1$ and $\Phi_3$ in the high state in the shown example), all the other switches being maintained off (signals $\Phi_2$, $\Phi_4$, $\Phi_5$, and $\Phi_6$ in the low state in this example). Capacitors $c_1$ and $c_2$ then charge to the value of signal $V_{IN}$.

At a time t2 subsequent to time t1, switch $s_3$ is turned off. Value V1 of signal $V_{IN}$ at time t2 is then stored in capacitor $c_2$. The voltage across capacitor $c_1$ keeps on following the variations of signal $V_{IN}$.

At a time t3 subsequent to time t2, switch $s_1$ is turned off. Value V2 of signal $V_{IN}$ at time t3 is then stored in capacitor $c_1$.

At a time t4 subsequent to time t3, switch $s_3$ is turned on. The voltage across each of capacitors $c_1$ and $c_2$ then takes value (V1+V2)/2.

At a time t5 subsequent to time t4, switch $s_3$ is turned off. Value (V1+V2)/2 is then stored in capacitors $c_1$ and $c_2$.

At a time t6 subsequent to time t5, switches $s_1$ and $s_2$ are turned on. Capacitors $c_1$ and $c_{out}$ then charge to the value of signal $V_{IN}$.

At a time t7 subsequent to time t6, switch $s_2$ is turned off. Value V3 of signal $V_{IN}$ at time t7 is then stored in capacitor $c_{out}$. The voltage across capacitor $c_1$ keeps on following the variations of signal $V_{IN}$.

At a time t8 subsequent to time t7, switch $s_1$ is turned off. Value V4 of signal $V_{IN}$ at time t8 is then stored in capacitor $c_1$.

At a time t9 subsequent to time t8, switch $s_2$ is turned on. The voltage across each of capacitors $c_1$ and $c_{out}$ then takes value (V3+V4)/2.

At a time t10 subsequent to time t9, switch $s_2$ is turned off. Value (V3+V4)/2 is then stored in capacitors $c_1$ and $c_{out}$.

At a time t11 subsequent to time t10, switch $s_4$ is turned on. The voltage across each of capacitors $c_2$ and $c_{out}$ then takes value (V1+V2+V3+V4)/4.

Further, at time t11, switches $s_1$ and $s_5$ are turned on. Capacitors $c_1$ and $c_3$ then charge to the value of signal $V_{IN}$.

At a time t12 subsequent to time t11, switch $s_5$ is turned off. Value V5 of signal $V_{IN}$ at time t12 is then stored in capacitor $c_3$. The voltage across capacitor $c_1$ keeps on following the variations of signal $V_{IN}$.

Further, at time t12, switch $s_4$ is turned off. Value (V1+V2+V3+V4)/4 is then stored in capacitors $c_2$ and $c_{out}$.

At a time t13 subsequent to time t12, switch $s_1$ is turned off. Value V6 of signal $V_{IN}$ at time t13 is then stored in capacitor $c_1$.

At a time t14 subsequent to time t13, switch $s_5$ is turned on. The voltage across each of capacitors $c_1$ and $c_3$ then takes value (V5+V6)/2.

At a time t15 subsequent to time t14, switch $s_5$ is turned off. Value (V5+V6)/2 is then stored in capacitors $c_1$ and $c_3$.

At a time t16 subsequent to time t15, switches $s_1$ and $s_2$ are turned on. Capacitors $c_1$ and $c_{out}$ then charge to the value of signal $V_{IN}$.

At a time t17 subsequent to time t16, switch $s_2$ is turned off. Value V7 of signal $V_{IN}$ at time t17 is then stored in capacitor $c_{out}$. The voltage across capacitor $c_1$ keeps on following the variations of signal $V_{IN}$.

At a time t18 subsequent to time t17, switch $s_1$ is turned off. Value V8 of signal $V_{IN}$ at time t18 is then stored in capacitor $c_1$.

At a time t19 subsequent to time t18, switch $s_2$ is turned on. The voltage across each of capacitors $c_1$ and $c_{out}$ then takes value (V7+V8)/2.

At a time t20 subsequent to time t19, switch $s_2$ is turned off. Value (V7+V8)/2 is then stored in capacitors $c_1$ and $c_{out}$.

At a time t21 subsequent to time t20, switch $s_6$ is turned on. The voltage across each of capacitors $c_3$ and $c_{out}$ then takes value (V5+V6+V7+V8)/4.

At a time t22 subsequent to time t21, switch $s_6$ is turned off. Value (V5+V6+V7+V8)/4 is then stored in each of capacitors $c_3$ and $c_{out}$.

At a time t23 subsequent to time t22, switch $s_4$ is turned on. The voltage across each of capacitors $c_2$ and $c_{out}$ then takes value (V1+V2+V3+V4+V5+V6+V7+V8)/8. The average of the 8 samples V1 to V8 is then available on output node OUT of circuit 200.

At a time t24 subsequent to time t23, switch $s_4$ may be turned off to enable to use capacitor $c_2$ again for a new measurement.

Figure 4:
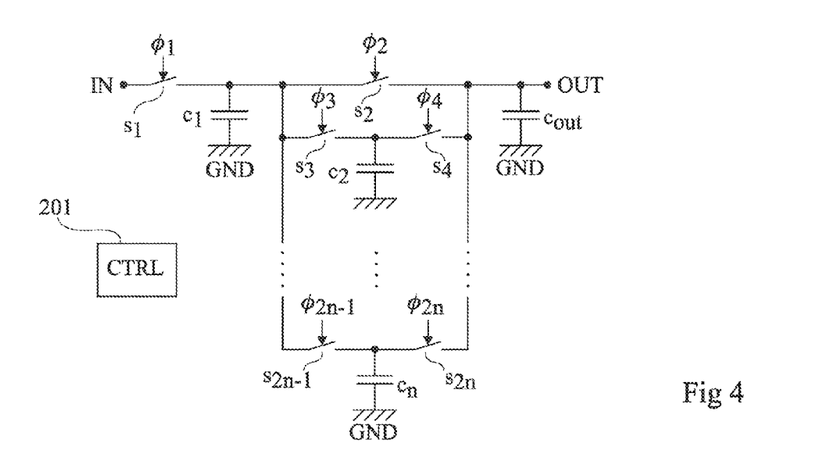
FIG. 4 is a partial electric diagram of another embodiment of a circuit enabling to implement a CMS-type reading in a CMOS image sensor.

FIG. 4 is an electric diagram of an embodiment of circuit 200 of FIG. 2, generalized to case $M=2^n$ for any n greater than or equal to 2.

Circuit 200 of FIG. 4 comprises, as in the example of FIG. 2, two capacitors $c_1$ and $c_{out}$ and two switches $s_1$ and $s_2$, arranged in the same way as in the example of FIG. 2 between input node IN and output node OUT of the circuit.

Circuit 200 of FIG. 4 further comprises, in parallel with switch $s_2$, n−1 branches each comprising two switches $s_{2i-1}$ and $s_{2i}$ in series between the first electrode of capacitor $c_1$ and the first electrode of capacitor $c_{out}$. In each branch, the junction point of switches $s_{2i-1}$ and $s_{2i}$ is connected to a node of application of reference potential GND by a capacitor $c_i$, where i is an integer in the range from 2 to n.

The control nodes of switches $s_1$ to $s_{2n}$ are respectively connected to nodes of application of control signals $\Phi_1$ to $\Phi_{2n}$.

Circuit 200 further comprises a control unit 201 (CTRL) capable of providing switches $s_1$ to $s_{2n}$ with a control sequence capable of implementing the calculation, by circuit 200, of the average of M successive samples of potential $V_{IN}$ of node IN, and of delivering the calculated average value onto output node OUT of the circuit, for example, a control sequence of the type described in relation with FIG. 3.

In the case where M=2 (n=1), circuit 200 for example only comprises capacitors $c_1$ and $c_{out}$, switches $s_1$ and $s_2$, and a control unit 201 (CTRL) capable of providing switches $s_1$ and $s_2$ with a control sequence capable of calculating the average of 2 successive samples of potential $V_{IN}$, and of delivering the calculated average value onto output node OUT of the circuit.

Figure 5:
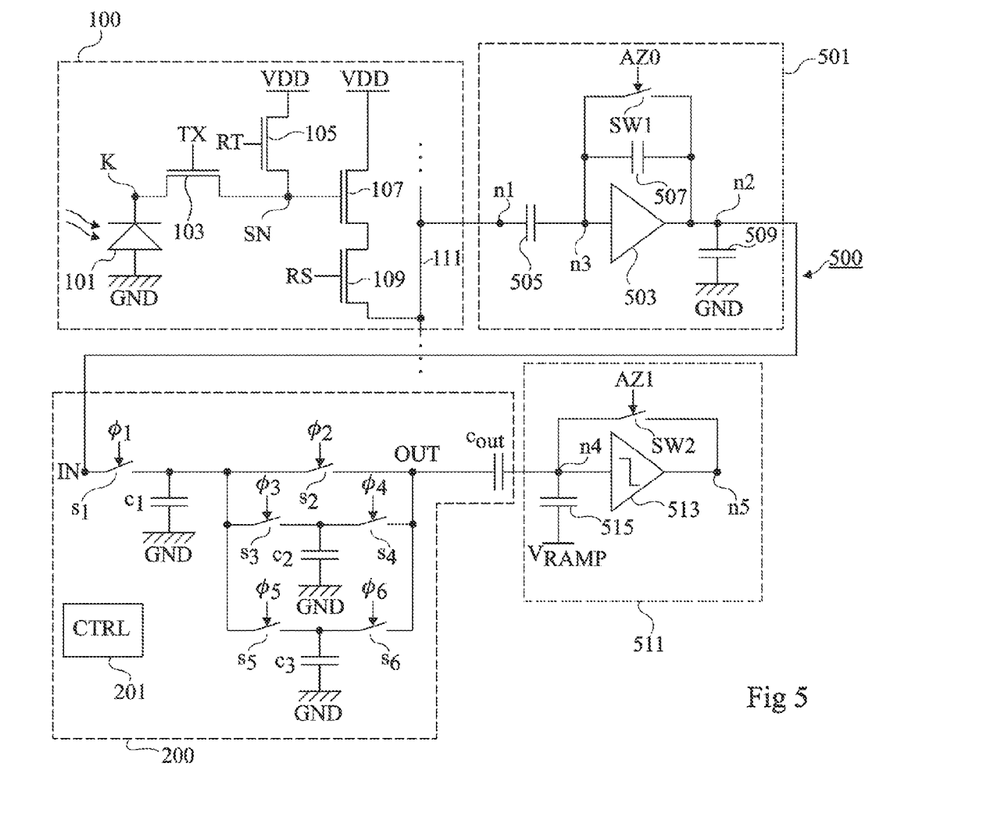
FIG. 5 is a partial electric diagram of an embodiment of a CMOS image sensor capable of implementing a CMS-type reading.

FIG. 5 is a partial electric diagram of an embodiment of a CMOS image sensor 500 capable of implementing a CMS-type reading.

In this example, sensor 500 comprises at least one pixel 100 of the type described in relation with FIG. 1. Photodiode 101 of pixel 100 preferably is a pinned photodiode or buried photodiode. The use of a pinned diode indeed enables to decrease the pixel noise, and more particularly the noise due to dark currents and the reset noise. In practice, sensor 500 may comprise a plurality of identical or similar pixels 100. Pixels 100 may for example be arranged in rows and columns. As an example, the pixels of a same column are connected to a same output track 111 and the pixels of different columns are connected to different output tracks 111. Further, as an example, the pixels of a same row have their nodes of application of control signals TX, RT, and RS respectively interconnected, which enables to control the sensor pixels row by row. The described embodiments are however not limited to this specific arrangement of the sensor pixels. Further, the described embodiments are compatible with other pixel structures than those described in relation with FIG. 1.

In this example, sensor 500 comprises an amplification stage 501 having an input node n1 connected to output track 111 of pixel 100. Amplification stage 501 is capable of providing, on an output node n2 of stage 501, a voltage equal to the voltage on node n1, multiplied by a gain G. Amplification stage 501 particularly enables to decrease the thermal noise of the pixel. In the shown example, amplification stage 501 comprises an amplifier 503 having its input connected to a node n3 and having its output connected to node n2. Stage 501 further comprises a capacitor 505 connecting node n1 to node n2, a capacitor 507 connecting node n3 to node n2, a switch SW1 connecting node n3 to node n2 in parallel with capacitor 507, and a capacitor 509 connecting node n2 to a node of application of low reference potential GND. The control node of switch SW1 is connected to a node of application of a control signal AZ0. Gain G of amplification stage 501 is a function of the ratio of the capacitance of capacitor 505 to the capacitance of capacitor 507. Switch SW1 enables, when it is on, to reset the offset voltage of amplifier 503.

Sensor 500 further comprises an analog average calculation circuit 200, of the type described in relation with FIGS. 2, 3, and 4. In the shown example, average calculation circuit 200 is identical or similar to circuit 200 of FIG. 2. Thus, in this example, circuit 200 is capable of calculating the average of M=8 successive samples of the input signal. As a result, as will be detailed hereafter, sensor 500 is capable of implementing a CMS-type reading method, where 8 samples of the reset potential, respectively of the signal potential, are averaged. It will however be within the abilities of those skilled in the art to adapt circuit 200 to form a sensor capable of implementing a CMS reading with a number M of averaged samples different from 8.

In the shown example, input node IN of circuit 200 is connected to output node n2 of amplification stage 501. Further, in this example, the electrode of capacitor $c_{out}$ opposite to node OUT, instead of being directly connected to a node of application of low reference potential GND as in the example of FIG. 6, is connected to an input node n4 of a single-ramp analog-to-digital converter 511, where node n4 may for example be taken to reference potential GND during an average calculation phase.

In this example, analog-to-digital converter 511 comprises a comparator having its input connected to node n4 and having its output connected to a node n5, and a switch SW2 connecting node n4 to node n5. The control node of switch SW2 is connected to a node of application of a control signal AZ1. Analog converter 511 further comprises a capacitor 515 connecting node n4 to a node $V_{RAMP}$ of application of a voltage ramp. Converter 511 further comprises a ramp generator, not shown, capable of applying a voltage ramp to node $V_{RAMP}$, and a circuit, not shown, capable of successively sampling a plurality of times the state of output node n5 of comparator 513 during the period of application of the voltage ramp, to generate a digital word representative of the voltage level at the input of converter 511.

In practice, in the case of a sensor comprising a plurality of pixels, amplification stage 501, average calculation circuit 200, and analog-to-digital stage 511 may be shared by a plurality of pixels of the sensor. Sensor 500 further comprises one amplification stage 501, one average calculation circuit 200, and one analog-to-digital conversion circuit 511 per output track 111, that is, per pixel column in the above-mentioned example.

FIG. 6 is a timing diagram illustrating an example of a method of controlling the sensor of FIG. 5. In this example, a CMS-type reading with M=8 averaged samples is implemented. FIG. 6 more specifically shows the time variation of potential $V_{SN}$ of sense node SN of pixel 100, and of control signals RS, RT, TX, AZ0, $\Phi_1$, $\Phi_2$, $\Phi_3$, $\Phi_4$, $\Phi_5$, $\Phi_6$, and AZ1 of pixel 100, of amplification stage 501, of average calculation circuit 200, and of analog-to-digital conversion stage 511.

At a time t1' before the end of an integration phase of pixel 100, reset transistor 105 of the pixel is turned on (signal RT in the high state in this example) to reset the potential of sense nose SN, after which transistor 105 is turned off at a time t2' subsequent to time t1', to isolate node SN from node VDD. At time t1', selection transistor 109 is further set to the on state (signal RS in the high state in this example). Further, at time t1', switches SW1 and SW2 are turned on, which causes the resetting to zero of the offset of amplification stage 501 and of analog-to-digital conversion stage 511.

At a time t3' subsequent to time t2', switch SW1 is turned off. The voltage across capacitor 509 is then substantially equal to the voltage on track 111, multiplied by gain G of the amplification stage, and varies proportionally to the voltage variations on track 111.

Between a time t4' subsequent to time t3', and a time t7' subsequent to time t4', a control sequence of circuit 200, identical or similar to the control sequence described in relation with FIG. 3, is implemented. In the shown example, times t4' and t7' respectively correspond to times t1 and t24 of FIG. 3. At the end of this sequence, capacitor $c_{out}$ has between its terminals a voltage VR substantially equal to the average of 8 successive samples of the output signal of amplification stage 501. Voltage VR is representative of the reset potential of sense node SN of the pixel, multiplied by gain G.

At a time t5' subsequent to the acquisition of the last sample of the reset potential, that is, subsequent to time t18 of the sequence of FIG. 3, transfer transistor 103 of pixel 100 is set to the on state (signal TX in the high state in this example), to transfer the photogenerated charges accumulated in photodiode 100 onto sense node SN of the pixel. The voltage at node SN then decreases by a value representative of the amount of photogenerated charges stored in the photodiode, and thus of the light intensity received by the photodiode during the integration. At a time t6' subsequent to time t5', transistor 103 is turned back off to isolate node SN from node K. In the shown example, the transfer of the photogenerated charges onto node SN is performed during a transfer period t5'-t6' between times t18 and t24 of the average calculation sequence of FIG. 3. More particularly, in the shown example, the transfer of the photogenerated charges is performed between times t18 and t20 of the sequence of FIG. 3. The described embodiments are however not limited to this specific case. As a variation, the transfer of the photogenerated charges onto node SN may be performed after time t7'.

Between a time t8' subsequent to time t7' and subsequent to the transfer of the photogenerated charges onto node SN, and a time t9' subsequent to time t8', a control sequence for circuit 200, identical or similar to the control sequence described in relation with FIG. 3, is implemented again. In the shown example, times t8' and t9' respectively correspond to times t1 and t24 of FIG. 3. At the end of this sequence, capacitor $c_{out}$ has between its terminals a voltage VS substantially equal to the average of 8 successive samples of the output signal of amplification stage 501. Voltage VS is representative of the signal potential of sense node SN of the pixel, multiplied by gain G.

At time t8', switch SW2 is further turned off (signal AZ1 in the low state in this example). As a result, from time t8' on, the voltage on input node n4 of analog-to-digital converter 511 is equal to the difference between the voltage across capacitor $c_{out}$ at time t8' (that is, voltage VR) and the voltage across capacitor $c_{out}$ at the current time.

At time t9', the voltage on input node n4 of analog-to-digital converter 511 is thus substantially equal to VR–VS. This voltage defines an output value of the pixel, and may be digitized by analog converter 511, by applying an adapted voltage ramp to node $V_{RAMP}$ of converter 511.

An advantage of sensor 500 is that it enables to implement a CMS-type reading, which reading does not limit the dynamic range of the sensor pixels, and this, whatever number M of samples averaged during the measurement.

Further, average calculation circuit 200 is particularly simple to form and has a relatively low electric power consumption.

Further, in the example of FIG. 5, the analog-to-digital conversion step is advantageously used to analogically calculate the difference between the reset potential level of the pixel and the signal potential level of the pixel.

Specific embodiments have been described. Various alterations, modifications, and improvements will readily occur to those skilled in the art.

In particular, the described embodiments are not limited to the specific example described in relation with FIG. 5 where an amplification stage is provided between the output track of the pixel and the input of the average calculation circuit. As a variation, amplification stage 501 of the example of FIG. 5 may be omitted or replaced with a different amplification stage.

Further, the described embodiments are not limited to the specific example described in relation with FIG. 5, where the difference between the average of the M samples of the reset potential and the average of the M samples of the signal potential is calculated by means of the analog-to-digital conversion stage coupled to the pixel. As a variation, the difference between the averages may be calculated by any other adapted analog subtraction circuit.

Further, although an example of an average calculation circuit based on switched capacitances has been described, the described embodiments are not limited to this specific example. More generally, any other circuit capable of analogically calculating an average of a plurality of successive samples of an output signal of a pixel of the sensor, without generating an intermediate signal having a value greater than the value of the largest sample, may be used to replace above-described circuit 200, for example, a circuit based on switched capacitances having an architecture different from that described hereabove, or a circuit based on transistors.

Further, in the case where an average calculation circuit based on switched capacitances of the type described hereabove is used, it will be within the abilities of those skilled in the art to provide other control sequences than the sequence of FIG. 3 to acquire M samples of the voltage on input node IN of the circuit, and deliver, on output node OUT of the circuit, a voltage equal to the average of the M samples.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A CMOS image sensor comprising at least one pixel and one circuit arranged to receive, on a first node of the circuit, an analog signal representative of the luminosity level received by the pixel, the circuit being capable of successively acquiring $2^n$ samples of said signal, n being an integer greater than or equal to 2, and of delivering, on a second node of the circuit, an analog signal having a value equal to the average of the values of said samples, without generating an intermediate signal having a value greater than the value of the largest acquired sample, the circuit comprising:

first and second capacitors, the second capacitor having a first electrode connected to the first node via a first switch, and a second electrode connected to a node of application of a reference potential, and the first capacitor having a first electrode connected to the second node and connected to the first electrode of the second capacitor via a second switch, and a second electrode connected to a node of application of the reference potential;

n−1 branches, each comprising two switches in series between the first electrode of the second capacitor and the first electrode of the first capacitor, and a capacitor connecting the junction point of the two switches of the branch and a node of application of the reference potential; and a control unit capable of controlling the switches to successively acquire $2^n$ samples of the voltage at the first node in the n+1 capacitors, and of delivering, across the second capacitor, a voltage equal to the average of the acquired samples.

2. The sensor of claim 1, wherein said capacitors have the same capacitance.

3. The sensor of claim 1, wherein the first node of the circuit is connected to the pixel via an amplification stage.

4. The sensor of claim 1, wherein said pixel comprises a photodiode connected to a sense node by a transfer transistor.

5. The sensor of claim 4, comprising a control circuit capable of, during a phase of reading an output value of the pixel:

resetting the sense node;

controlling the circuit to acquire $2^n$ samples representative of the potential of the sense node and delivering a first analog signal having a value equal to the average of these samples;

transferring photogenerated charges stored in the photodiode of the pixel onto the sense node via the transfer transistor;

controlling the circuit to acquire $2^n$ samples representative of the potential of the sense node and deliver a second analog signal having a value equal to the average of these samples; and delivering an output value equal to the difference between the first and second analog signals.

* * * * *